United States Patent [19]

Maistre

[11] Patent Number: 4,612,750
[45] Date of Patent: Sep. 23, 1986

[54] PRE-STRESSED TRUSS-LIKE BEAM WITH ELEMENTS IN BUCKLED STATE

[75] Inventor: Michel Maistre, Bordeaux, France

[73] Assignee: Societe Europeenne de Propulsion, Puteaux, France

[21] Appl. No.: 703,517

[22] Filed: Feb. 20, 1985

[30] Foreign Application Priority Data

Feb. 20, 1984 [FR] France .................. 84 02525

[51] Int. Cl.⁴ .......................... E04H 12/00
[52] U.S. Cl. ........................ 52/638; 52/648; 52/DIG. 10
[58] Field of Search ............ 52/637, 638, 648, 108, 52/DIG. 10

[56] References Cited

U.S. PATENT DOCUMENTS

| | | | |
|---|---|---|---|
| 3,063,521 | 11/1962 | Fuller | 52/63 |
| 3,169,611 | 2/1965 | Snelson | 52/648 |
| 3,277,614 | 10/1966 | Marie | 52/2 |
| 3,354,591 | 12/1967 | Fuller | 52/648 |
| 3,665,670 | 5/1972 | Rummler | 52/648 |
| 4,161,088 | 7/1979 | Gugliotta | 52/648 |
| 4,207,715 | 6/1980 | Kitrick | 52/81 |
| 4,277,922 | 7/1981 | McAllister | 52/108 X |

FOREIGN PATENT DOCUMENTS

| | | |
|---|---|---|
| 618523 | 10/1932 | Fed. Rep. of Germany . |
| 2025704 | 5/1970 | Fed. Rep. of Germany . |
| 1236929 | 6/1960 | France .................. 52/648 |
| 1377291 | 9/1964 | France . |
| 2038914 | 7/1980 | United Kingdom . |

OTHER PUBLICATIONS

Rapport De Recherche, Republique Francaise, Institut National de la Propriete Industrielle, completed Nov. 5, 1984, by Examiner F. M. Laue.

Primary Examiner—William F. Pate, III
Assistant Examiner—John Malcolm White
Attorney, Agent, or Firm—Staas & Halsey

[57] ABSTRACT

The truss-like beam is formed by the regular repetition along the axis of the beam, of polyhedral elementary cells, each one having two parallel and identical end faces, shaped as regular polygons with n sides which constitute the faces shared with the adjacent cells, and 2n triangular lateral faces formed by joining each apex of an end face to the two closest apices of the opposite end face; the edges of the elementary cell are materialized by elements which are permanently subjected to a pulling force, whereas rigid bars in buckled state join each apex of the elementary cell to its center.

10 Claims, 4 Drawing Figures

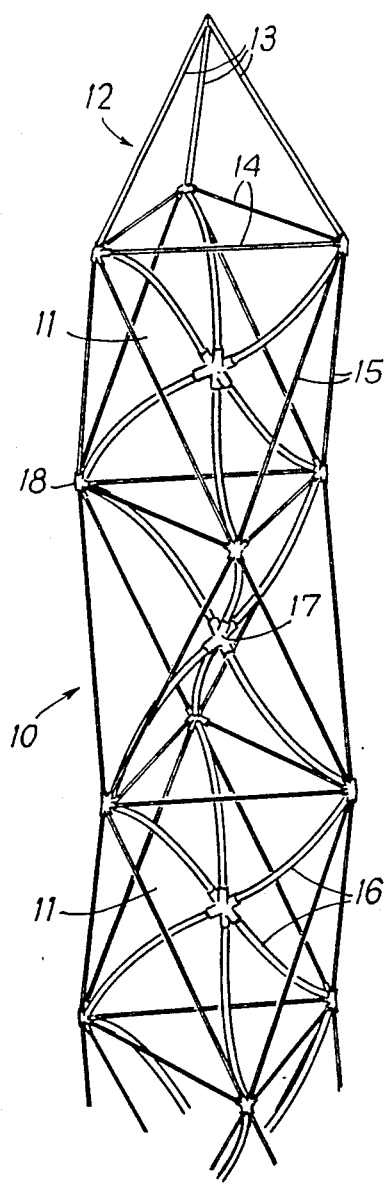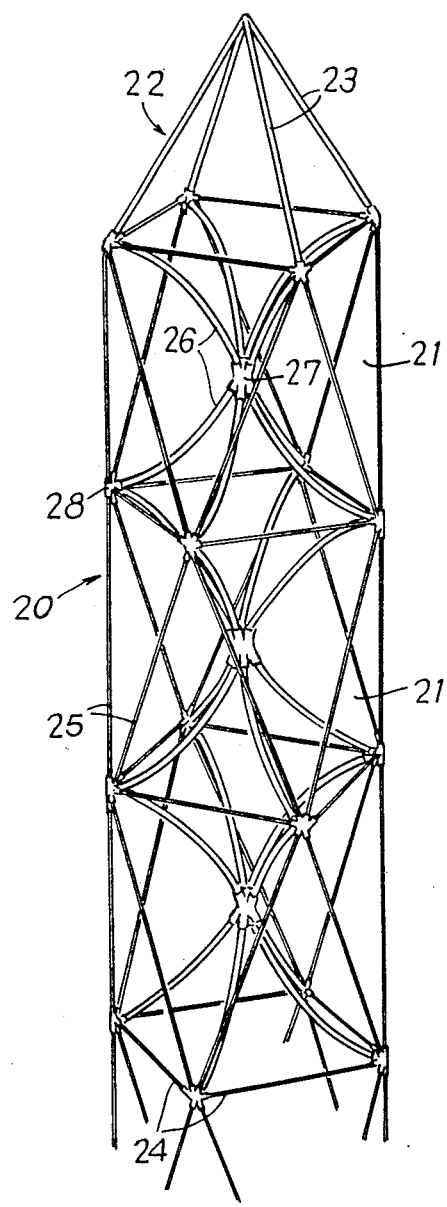

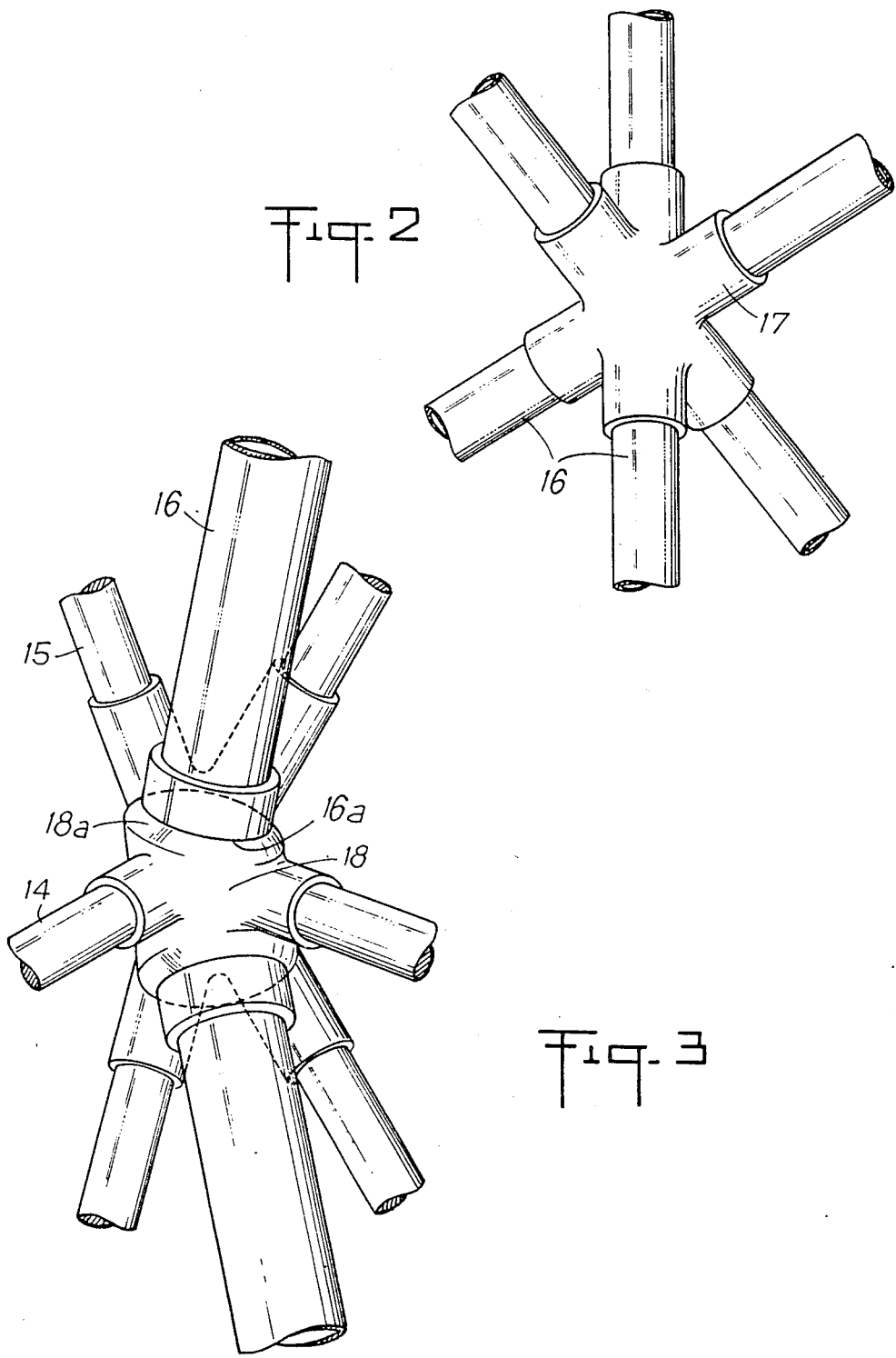

PRE-STRESSED TRUSS-LIKE BEAM WITH ELEMENTS IN BUCKLED STATE

The present invention relates to a truss-like beam and more particularly to a beam of the type formed by the regular repetition along the axis of the beam, of polyhedral elementary cells, each one having two parallel and identical end faces, shaped as regular polygons with n sides which constitute the faces shared with the adjacent cells.

Truss-like beams are normally used as frame elements in construction, bridges and various types of equipment such as cranes, towers, antennas, etc. . . .

They are of elongated shape and have a greatly openworked appearance. They are generally formed by assembling rigid elements of elongated shape (bars) to constitute a stable three-dimensional network or truss.

The truss often comprises, in addition to the rigid elements, flexible elements (cables) which, normally, brace the rigid elements and, in doing so, contribute to rigidify the assembly.

The quality sought when designing and dimensioning a truss-like beam generally is the best compromise between the three major properties which are, maximum tolerable loads, acceptable deformations and weight. Other considerations are often involved, in particular regarding costs, life span, safety, etc. . . .

The choice of the pattern of a truss-like beam structure and the determination of its dimensions are guided mainly by the field in which it will be used and the forces it will be subjected to not only during normal service conditions but also during accidental or exceptional service conditions.

The beam according to the invention is designed especially but non exclusively, to be used in the construction of very large cobweblike structures designed to constitute the framework of gigantic antennas, of solar energy collectors and other devices which are to be erected in space and more particularly in orbit around the earth.

The dimensions of such constructions, also known as "large space structures," are known to reach, depending on the projects under study, hundreds if not thousands of meters.

It is the object of the present invention to propose a truss-like beam of the type indicated hereinabove, in which, according to the invention:

each cell is delimited laterally by 2n triangular faces formed by joining each apex of one end face to the two closest apices of the opposite end face, the elementary edges of the cell are constituted by elements which are permanently undergoing tensile stresses, and rigid bars in buckled condition connect the apices of every elementary cell to its center.

A pre-stressed truss-like beam is obtained in which the geometry of each elementary cell is defined by the elements forming the edges, said elements being kept in tense condition by the buckled bars which also constitute a strongly deformable device used for adjusting and balancing the efforts on the cables.

Pre-stressing is applied by means of buckled bars rather than with non-deformed bars, this presenting great advantages.

Indeed, to pre-stress an elementary cell to the required level is a delicate operation to perform with non-deformed bars. First the bars used must all have identical properties, this imposing very close manufacturing tolerances which really bring up the price of the beam. Then the pre-stressing operation must be set with great accuracy when assembling the elements making up the beam, this raising major difficulties when the beam in question is designed to be used in large space structures.

All the aforesaid disadvantages are avoided and the pre-stressing adjustments considerably simplified when using buckled bars, as it is well-known that the strains supported by a bar is then virtually constant whatever the level of deformation. Manufacturing tolerances for such bars are therefore much broader and assembly of the beam to reach to the required pre-stressing level becomes an easier operation.

The elements which materialize the edges of the elementary cell may be non rigid since, normally, they are only subjected to tensile stresses. It becomes then possible to use flexible or articulated elements such as cables or chains.

The buckled bars are obtained from rectilinear elements, which may be solid or hollow, with a constant cross-section. Preferably, the bars are tubular with circular cross-section.

The connection between each bar and the tense elements at one apex of the cell is comparable to a punctual support or to an articulation in all directions such as for example a ball-and-socket joint, so that, in that particular point, the orientation of the bar is indifferent to the orientation of the tense elements.

On the contrary, the connection between each bar and the other bars of the cell in the center of the latter, is rigid so that the relative orientation of the bars one with respect to the other, close to the intersecting point, is set in a definite state by the theoretical geometry of the cell.

The length of said bars is slightly more than the distance between an apex and the center of the polyhedron, so that the assembly such as described is only possible if the bars are bent in the form of an arc. Given the nature and orientation of the strains supported by each bar (compressive force directed along an axis going through the two ends of the bar), such deformation corresponds to buckling. The rigid connection in the center causes simultaneous buckling of all the bars.

The beam is designed to be normally subjected to pure compressive forces or to pure tensile forces only, but it is not excluded that said beam can also withstand bending or twisting forces. The application of compressive or tensile forces should be as evenly distributed as possible on the n apices of the end faces of the beam and in a direction as parallel as possible to its axis.

To this effect, the beam ends, at both its ends, into a bundle of n bars beginning at the n apices of the last end face of elementary cell and converging into a common point situated on the axis of the beam.

The elementary polyhedral cell with triangular side faces, has identical and parallel end faces, but these are offset one with respect to the other of an angle $\pi/n$ about the axis of the beam.

In its simplest design, the elementary cell is octahedral with triangular end faces.

The sizes of the elementary cell and of the elements constituting it, "tense elements" and "bars", are decided in relation to the final properties required, and based on the properties of the materials used, and amongst these, the equations relative to the buckling of beams and bars.

The invention will be more readily understood on reading the following description with reference to the accompanying drawings, in which:

FIG. 1 is a diagrammatical view of a section of a truss-like beam according to the invention with octahedral elementary cell.

FIG. 2 is a diagrammatical view of a connecting piece used in the center of the elementary cell of the beam illustrated in FIG. 1, FIG. 3 is a diagrammatical view of a connecting piece used at the apex of the elementary cell of the beam illustrated in FIG. 1, and FIG. 4 is a diagrammatical view of a section of a truss-like beam according to the invention with decahedral elementary cell.

The following examples give various solutions to one and the same problem which is to dimension as accurately as possible the weight of an 18.3 m-long beam designed for withstanding a maximum axial compression load of 4445 N.

EXAMPLE 1

The beam 10 (FIG. 1) is produced with "tense elements" of circular cross-section, made of a composite material based on carbon fibers and epoxy resin, of density 1500 Kg/m3 and of elastic modulus, in the longitudinal direction of 106 GPa, and with bars having the shape of tubes of circular cross-section with a 0.71 mm thick wall and produced from the same material as the tense elements. Said beam is formed by 31 identical cells (11) of octahedral shape, of height 57.2 cm, and by two end bundles (12) each one constituted by three bars (13) of same cross-section as those described hereinafter and of length such that the height of each bundle is 28.4 cm.

The octahedral cells (11) are defined by two triangular end faces formed by three tense elements (14) of length 28.8 cm and diameter 4.96 mm, and by six lateral edges formed by tense elements (14) of length 59.9 cm and diameter 4.96 mm. As illustrated in FIG. 1, the end faces of each cell are two equilateral triangles, offset one with respect to the other, by an angle of $\pi/3$ about the axis of the beam (10).

All the aforesaid elements, which are disposed along the edges of the octahedron are tensed by an assembly of six bars (16) interposed between each apex of the octahedron and its central point. Said hollow bars have an external diameter of 9.36 mm and an internal diameter of 7.94 mm.

In the central point, rigid connection between the six bars (16) is achieved by a molded piece (17) (FIG. 2), in aluminium alloy, having the shape of a bundle of six intersecting tubular tips with an internal diameter of 9.4 mm, into which can be inserted the six bars. The orientation of these tips is defined by the orientation of the three diagonals of the octahedral cell, that-is-to-say that they form together angles of 51°19', and with the axis of symmetry of the cell, angles of 30°.

Every apex of the octahedron is shared by two contiguous cells. It is the meeting point of six tense elements and two bars. Connection between these eight elements is achieved by a molded part (18) (FIG. 3) in aluminium alloy, representing a bundle of six intersecting tubular tips, of internal diameter 5.0 mm, into which tips the six tense elements can be adhesively engaged.

The orientations of these six tips are defined by the orientations of the edges of two contiguous cells, namely that they form angles of 60° between the two edges of the common face, of 27°48' between two lateral edges of the same mesh and of 76°06' between lateral edge and edge of the common face. Said part (18) is also provided with two convex spherical caps (18a) covered with a 1 mm-thick layer of rubber, on which caps can rest the ends of two bars (16) which are provided at their end with a tip (16a) shaped as a concave spherical cap. Said spherical caps have, as common center, the intersecting point of the six tips which coincides with the apex of the cell.

The length of the bars (16) is such that it is 2% over the theoretical length available between said resting point and the bottom limit to which the central connecting piece (17) can sink, namely, in the illustrated example, 32.6 cm against a theoretical 32 cm, this resulting in the bars (16) being all, permanently, in buckled condition, and exerting on the apices of the cell, constant stresses so oriented that they keep in tension all the elements (14,15) forming the edges of the cell, and this even when the beam is subjected to compressive forces between its outermost points, up to the limit load of 4445 N. Under that load, all the lateral elements are completely released and the beam yields without actually breaking up or suffering permanent damage.

Such 18.3 m-long beam, capable of withstanding compressive forces up to 4445 N between its two outermost points only weighs 7.25 kg, which weight represents 4.10 kg of tense elements, 1.85 kg of bars and 1.30 kg of connecting pieces. Under the limit load, said beam shortens by 7.7 mm i.e. 0.042%.

The aforesaid combination of performances places the beam according to the invention favorably with respect to a beam for large space structures, produced from the same material and according to the conventionally known method, namely a material in the form of a cylindrical tube of 17.2 cm diameter and 0.71 mm thickness, ending into conical-shaped tips. Said reference beam equipped with conical tips weighs 11.5 kg and only shortens by 2 mm, i.e. 0.011% under the limit load.

EXAMPLE 2

The beam according to this example has the same characteristics as that according to Example 1, except that the tense elements are produced from a composite material containing carbon fibers and epoxy resin, whose longitudinal elastic modulus is equal to 212 GPa.

As a result, the diameter of said elements may be reduced to 3.5 mm and the connecting pieces may also be made lighter.

Said beam, which is capable of withstanding the same load limits as the previous one, only weighs 4.70 kg this representing 2.05 kg of tense elements, 1.85 kg of bars and 0.80 kg of connecting pieces.

It shortens under the maximum load by the same value as the previous one.

EXAMPLE 3

The beam according to this example is produced with tense elements of which the density and longitudinal elastic modulus are respectively 1,500 kg/m3 and 212 GPa and with tube-shaped bars having 0.355 mm-thick walls which are produced from a material whose density and longitudinal elasticity modulus are, respectively, 1,500 kg/m3 and 106 GPa.

Said beam is composed of 26 octahedral cells of 68.5 cm height, and two end bundles, each one constituted by three bars having the same cross-section as that to be described hereinafter and of length such that each bundle has a height of 24.5 cm.

The octahedral cells are defined by two triangular end faces formed by three tense elements of 34.3 cm length and 2.95 mm diameter and by six lateral edges formed by tense elements of 71.3 cm length and 2.95 mm diameter.

The six bars have an external diameter of 12.60 mm and an internal diameter of 11.89 mm. Their length of 38.8 mm is greater by 2% than the theoretical length, so that they are in buckled state.

The connecting pieces are identical to those used in the preceding examples as regard the angles, but the tip diameters are adapted to the diameters of the tense elements and of the bars used in the present example, and they are produced of magnesium alloy instead of aluminium alloy.

Said 18.3 m long beam is capable of withstanding a compressive force up to 4445 N between its two outermost points and only weighs 3.35 kg which represent 1.45 kg of tense elements, 1.3 kg of bars and 0.6 kg of connecting parts.

It shortens by 10.8 mm under the maximum load, namely 0.059%.

EXAMPLE 4

The beam (20) (FIG. 4) according to this example is composed of decahedral cells (21). The end faces are squares defined by four tense "cross" elements (24). Said faces are connected by eight tense "lateral" elements (25) which define eight triangular lateral faces. The end faces of one cell being offset one with respect to the other by an angle of $\pi/4$ about the axis of the beam (20).

The beam is formed by 18 identical 96 cm-high cells, each of its ends forming a bundle (22) of four intersecting bars (23) of same cross-section as those to be described hereinafter, and of length such that each bundle has a height of 51 cm.

The tense elements (24,25) constituting the edges of the decahedral cells have a diameter of 3.06 mm. The "cross" elements (24) have a length of 35.3 cm whereas the "lateral" elements (25) have a length of 97.9 cm. All said tense elements are made from a composite material containing boron fibers and epoxy resin whose density and longitudinal elasticity modulus are respectively 1500 kg/m3 and 212 GPa.

The assembly of such elements following the direction of the edges of the decahedron, is tensed by an assembly of eight bars (26) interposed between each apex of the decahedron and its central point. Said tubular bars have an external diameter of 13.56 mm and an internal diameter of 12.85 mm, they are made from a composite material containing boron fibers and epoxy resin whose density and elasticity modulus are respectively 1500 kg/m3 and 106 GPa. The length of these bars is equal to 53.0 cm, namely 1% more than the theoretical distance of 52.5 cm existing between the sinking limit in the central connecting piece and the resting point on the piece connecting the tense elements at the top of the decahedron.

Said extra length is sufficient to cause buckling of the bars. Moreover, the rigid connection of the eight bars in the central point makes it so that buckling is simultaneous on the eight bars.

The central connecting piece (27) is made from magnesium alloy and has eight intersecting tubular tips of internal diameter 13.6 mm into which are inserted the eight bars. The orientation of said eight tips is defined by the orientation of the eight straight lines joining the central point of the decahedron to each of its apices. Each one makes an angle of 27°31' with respect to the axis of symmetry of the piece, and angles of 38°08' with respect to its two closest neighbors.

Each apex of a decahedron is shared by two contiguous cells. It is the meeting point of six tense elements and two bars. The connection between said eight elements is achieved by a molded part (28) of magnesium alloy which has the shape of a bundle of six intersecting tubular tips of internal diameter 3.1 mm into which can be adhesively engaged the six tense elements. The orientations of these six tips are defined by the orientations of the edges of two contiguous meshes, namely that they form angles of 90° between the two edges of the common face, of 20°48' between two lateral edges of the same cell and of 79°36' between the lateral edges and the edges of the common face. The two bars can rest on said part on spherical caps as described in the first example.

Said beam with decahedral cells of 18.3 m length, which is capable of withstanding a compressive force up to 4445 N between its two outermost points, only weighs 4.38 kg which represent 1.95 kg of tense elements, 1.83 kg of bars and 0.60 kg of connecting pieces. Under maximum load, it shortens by 6.8 mm, namely 0.037%.

These different versions of a beam of given length designed to withstand, at a maximum, a given compressive force, have only been described by way of example and non-restrictively to illustrate the variety of shapes and dimensions that the beam according to the invention can be given, and to what extent said beam can be lighter than a conventional tubular beam, which is a great advantage for the privileged use to be made of it, considering the cost of transport from earth into space.

Obviously, the pre-stressed beam according to the invention which is characterized by its structure resulting from the juxtaposition of identical polyhedral cells defined by elements stretched by an assembly of bars intersecting in the central point of every cell and by the fact that the bar assembly is in buckled state, can take other shapes and dimensions than those described hereinabove, be produced from other material and be put to other uses.

The object, in the illustrated examples, has been essentially to meet a requirement of resistance under compression, this being generally the most critical characteristic for this type of beam, but this does not exclude for such a beam the possibility of withstanding forces of other natures such as tensile, twisting or bending forces.

The application of a pulling force over the whole length of the beam pre-supposes that the end bundles are themselves capable of transmitting these forces to the lattice constituted by the tense elements. It is necessary then for the bars constituting said end bundles to be suitably locked on the connecting pieces of the tense elements up to which they reach, which is not a problem.

The beam can thus be subjected to a pulling force and is even capable of withstanding a pulling force which is greater than the maximum compressive force. Thus, the beams with octahedral meshes of Examples 1, 2 and 3 are capable of withstanding a pulling force up to 13335 N whereas the beam with the decahedral cells of Example 4 is capable of withstanding a pulling force of up to 25900 N.

What we claim is:

1. Truss-like beam formed by the regular repetition along the axis of the beam, of polyhedral elementary cells, each cell having two parallel and identical end faces, shaped as regular polygons with n sides which constitute the faces shared with the adjacent cells, wherein, when the beam is in operating condition:

each end face is rotated with respect to the other relative to the axis of the beam, each cell is defined laterally by 2n triangular faces formed by joining each apex of one end face to the two closest apices of the opposite end face, the elementary edges of the cell are formed by elements which are permanently undergoing tensile stresses, and rigid bars in buckled condition due to induced axial loading connect the apices of every elementary cell to its center.

2. Truss-like beam as claimed in claim 1, wherein each buckled bar has one end connected rigidly to the other bars of same elementary cell, in the center thereof, whereas its other end is articulated on an apex of the cell.

3. Truss-like beam as claimed in claim 2, wherein each apex of each elementary cell includes a connecting piece having six housings for receiving the ends of the elements undergoing tensile stress converging at the connecting piece, and two support surfaces for the end surfaces of the bars joining the apex to the centers of two elementary cells having said apex in common.

4. Truss-like beam as claimed in claim 3, wherein said support surfaces and end surfaces have the shape of spherical caps.

5. Truss-like beam as claimed in claim 1, wherein said beam ends, at both its ends, into a bundle of n bars beginning at the n apices of the last end face of elementary cell and converging into a common point situated on the axis of the beam.

6. Truss-like beam as claimed in any one of claims 1 to 5, wherein the elements undergoing tensile stress forming the edges of the elementary cell are not rigid.

7. Truss-like beam as claimed in any one of claims 1 to 6, wherein the bars connecting every apex of an elementary cell to the center of the cell are tubular elements of circular cross-section.

8. Truss-like beam as claimed in any one of claims 1 to 7, wherein the elementary cells are octahedral with two parallel triangular end faces, rotated one with respect to the other by angle of $\pi/3$ relative to the axis of the beam.

9. Truss-like beam as claimed in any one of claims 1 to 8, wherein the elementary cells are decahedral with two parallel square end faces rotated one with respect to the other by an angle of $\pi/4$ relative to the axis of the beam.

10. Use of a truss-like beam such as claimed in claim 1, for the construction of large space structures.

* * * * *